United States Patent
Gurnov et al.

(10) Patent No.: US 11,037,173 B1
(45) Date of Patent: Jun. 15, 2021

(54) SYSTEMS AND METHODS FOR ANOMALY DETECTION IN AUTOMATED WORKFLOW EVENT DECISIONS IN A MACHINE LEARNING-BASED DIGITAL THREAT MITIGATION PLATFORM

(71) Applicant: Sift Science, Inc., San Francisco, CA (US)

(72) Inventors: Kostyantyn Gurnov, San Francisco, CA (US); Vera Dadok, San Francisco, CA (US); Duy Tran, San Francisco, CA (US); Arjun Krishnaiah, San Francisco, CA (US); Hui Wang, San Francisco, CA (US); Yuan Zhuang, San Francisco, CA (US); Wei Liu, San Francisco, CA (US)

(73) Assignee: Sift Science, Inc., San Francisco, CA (US)

( * ) Notice: Subject to any disclaimer, the term of this patent is extended or adjusted under 35 U.S.C. 154(b) by 0 days.

(21) Appl. No.: 17/109,639

(22) Filed: Dec. 2, 2020

Related U.S. Application Data

(60) Provisional application No. 62/947,992, filed on Dec. 13, 2019, provisional application No. 62/972,796, filed on Feb. 11, 2020.

(51) Int. Cl.
*G06Q 99/00* (2006.01)
*G06Q 30/00* (2012.01)
(Continued)

(52) U.S. Cl.
CPC ..... *G06Q 30/0185* (2013.01); *G06F 16/2474* (2019.01); *G06N 3/04* (2013.01);
(Continued)

(58) Field of Classification Search
CPC ............... G06Q 30/0185; G06Q 10/10; G06F 16/2474; G06F 21/552; G06F 21/554;
(Continued)

(56) References Cited

U.S. PATENT DOCUMENTS 10,491,617 B1 * 11/2019 Sadaghiani ......... H04L 63/1408

\* cited by examiner

*Primary Examiner* — Charlotte M Baker
(74) *Attorney, Agent, or Firm* — Padowithz Alce; Alce PLLC

(57) ABSTRACT

A system and method for automated anomaly detection in automated disposal decisions of an automated decisioning workflow includes collecting a time-series of automated disposal decision data for a current period from an automated decisioning workflow, wherein the automated decisioning workflow computes one of a plurality of distinct disposal decisions for each distinct input comprising subject online event data and a machine learning-based threat score computed for the subject online event data; selecting an anomaly detection algorithm from a plurality of distinct anomaly detection algorithms based on a type of online abuse or online fraud that the automated decisioning workflow is configured to evaluate; evaluating, using the selected anomaly detection algorithm, the time-series of automated decision data for the current period; computing whether anomalies exist in the time-series of automated disposal decision data for the current period based on the evaluation; and generating an anomaly alert based on the computation.

19 Claims, 4 Drawing Sheets

(51) Int. Cl.
*G06N 3/04* (2006.01)
*H04L 12/24* (2006.01)
*G06N 3/08* (2006.01)
*G06Q 10/10* (2012.01)
*G06F 16/2458* (2019.01)

(52) U.S. Cl.
CPC .............. *G06N 3/08* (2013.01); *G06Q 10/10* (2013.01); *H04L 41/0631* (2013.01)

(58) Field of Classification Search
CPC ...... G06F 21/566; G06F 16/958; G06F 21/10; G06N 3/08; G06N 3/04; H04L 41/0631
USPC ......................................................... 705/318
See application file for complete search history.

200

```
┌─────────────────────────────────────────────────────┐
│ CONFIGURING AN ANOMALY DETECTION MODULE S205        │
└─────────────────────────────────────────────────────┘

MONITORING AND COLLECTING DECISION DATA S210

ACCESSING HISTORICAL ALERT DATA S220

IMPLEMENTING ANOMALY DETECTION S230

GENERATING AN ANOMALY NOTIFICATION S240
    NOTIFICATION GENERATION S241
    ANOMALY REMEDIATION S242
```

FIGURE 2

SYSTEMS AND METHODS FOR ANOMALY DETECTION IN AUTOMATED WORKFLOW EVENT DECISIONS IN A MACHINE LEARNING-BASED DIGITAL THREAT MITIGATION PLATFORM

CROSS-REFERENCE TO RELATED APPLICATIONS

This application claims the benefit of U.S. Provisional Application No. 62/947,992, filed 13 Dec. 2019, U.S. Provisional Application No. 62/972,796, filed 11 Feb. 2020, which are incorporated herein in their entireties by this reference.

TECHNICAL FIELD

This invention relates generally to the digital fraud and abuse field, and more specifically to a new and useful system and method for detecting digital fraud or digital abuse and evolving underlying machine learning models in the digital fraud and abuse field.

BACKGROUND

The modern web and Internet enables entities to engage and perform an incalculable number of activities. Many of these activities involve user-to-user activities, user-to-business activities (or the reverse), and the like. These activities between users and between users and organizational entities over the web often involve the access, use, and/or exchange of information by one or more of the parties of the activities. Because of the malleable nature of the digital realm that these activities operate within, there arise a countless number of digital threats by digital actors that aim to commit digital fraud and/or digital abuse using online services and/or Internet-accessible applications (e.g., web or mobile applications). Additionally, some of these bad digital actors may also aim to misappropriate the information (e.g., hack) being exchanged between legitimate entities to these activities. These digital threats may also be perpetrated by malicious third-parties who seek to unlawfully or otherwise, impermissibly take advantage of the data or information that is exchanged or, if not exchanged, data or information about the activities or actions of users and/or businesses on the web.

Other digital threats involving a malicious party or a bad digital actor that acts unilaterally (or in concert with other malicious actors) to abuse digital resources of a service provider to perpetrate fraud or other unlawful activities that are also of significant concern to legitimate service providers and users of the Internet.

While there may currently exist some technologies that attempt to detect digital fraud and digital abuse or other malicious digital activities over the Internet, these existing technology implementations may not sufficiently detect malicious digital activities over the Internet with accuracy and in real-time to provide an opportunity for an appropriate response by an affected party. Additionally, these existing technology implementations lack the capabilities to detect new and/or never been encountered before digital threats and automatically (or near automatically) evolve the technology implementation to effectively respond and neutralize the digital threats.

Therefore, there is a need in the digital fraud and abuse field for a digital fraud and abuse solution that enables effective detection of multiple and specific digital threats involving digital fraud and/or digital abuse via digital resources of a service provider. The embodiments of the present application described herein provide technical solutions that address, at least, the need described above.

SUMMARY OF THE INVENTION(S)

In one embodiment, a method for automated anomaly detection in automated disposal decisions of an automated decisioning workflow of a machine learning-based online fraud and online abuse mitigation platform includes periodically collecting a near real-time or a real-time time-series of automated disposal decision data for a current period from an automated decisioning workflow, wherein the automated decisioning workflow computes one of a plurality of distinct disposal decisions for each distinct input comprising subject online event data and a machine learning-based threat score computed for the subject online event data; selecting an anomaly detection algorithm from a plurality of distinct anomaly detection algorithms based on a type of online abuse or online fraud that the automated decisioning workflow is configured to evaluate; evaluating, using the selected anomaly detection algorithm, the time-series of automated decision data for the current period; computing whether one or more anomalies exist in the time-series of automated disposal decision data for the current period based on the evaluation; and generating an anomaly alert based on the computation.

In one embodiment, the method includes automatically accessing, from a historical decisions database, a historical time-series of automated disposal decision data collected during a historical period from automated decisioning workflow, wherein evaluating the time-series automated disposal decision data for the current period includes evaluating the time-series of automated disposal decision data for the current period against the historical time-series of automated disposal decision data from the historical period.

In one embodiment, the method includes computing one or more current decision rates for at least one of the plurality of distinct disposal decisions of the automated decision workflow based on the time-series of automated disposal decision data for the current period; and computing one or more historical decision rates for the at least one of the plurality of distinct disposal decisions of the automated decision workflow based on the time-series of automated disposal decision data for the historical period.

In one embodiment, the anomaly detection algorithm comprises a statistically-based algorithm that, when applied, computes one or more statistical difference values between the one or more current decision rates and the one or more historical decision rates.

In one embodiment, computing the one or more statistical difference values includes: arranging the time-series of automated disposal decision data for the current period in an overlapping manner with the time-series of automated disposal decision data for the historical period; and computing one or more statistical difference values along each of a plurality of distinct time slices of the overlapping time-series of automated disposal decision data.

In one embodiment, computing whether one or more anomalies exist in the time-series of automated disposal decision data for the current period includes: identifying whether the one or more statistical difference values satisfy an anomaly detection threshold.

In one embodiment, the anomaly detection algorithm includes implementing a trained machine learning algorithm that predicts a time-series of predicted automated disposal decision data for the current period; and the anomaly detection algorithm, when applied, includes computing one or more statistical difference values between the one or more current decision rates and one or more predicted decision rates computed based on the time-series of predicted automated disposal decision data.

In one embodiment, computing whether one or more anomalies exist in the time-series of automated disposal decision data for the current period includes: identifying whether the one or more statistical difference values satisfy an anomaly detection threshold.

In one embodiment, the trained machine learning algorithm comprises long short-term memory networks.

In one embodiment, when an anomaly is identified based on the computation whether one or more anomalies exist in the time-series of automated disposal decision data for the current period, automatically accessing historical anomaly alert data for the automated disposal decision workflow; and if the generated anomaly alert does not match a historical anomaly alert of the historical anomaly alert data, then communicating the generated anomaly alert in a notification to a subscriber to the machine learning-based online fraud and online abuse mitigation platform.

In one embodiment, when an anomaly is identified based on the computation whether one or more anomalies exist in the time-series of automated disposal decision data for the current period, automatically accessing historical anomaly alert data for the automated disposal decision workflow; and if the generated anomaly alert matches a historical anomaly alert of the historical anomaly alert data, then muting the generated anomaly alert.

In one embodiment, when an anomaly is identified based on the computation whether one or more anomalies exist in the time-series of automated disposal decision data for the current period: computing a root cause of the anomaly based on characteristics of the anomaly; and generating a proposed remediation response to the anomaly based on the root cause.

In one embodiment, if the generated anomaly alert does not match a historical anomaly alert of historical anomaly alert data, then communicating the generated anomaly alert in a notification to a subscriber to the machine learning-based online fraud and online abuse mitigation platform; the notification comprises the root cause of the anomaly and the proposed remediation response.

In one embodiment, the anomaly detection algorithm includes implementing a trained machine learning algorithm that predicts an anomaly based on input image comprising current and historical time-series data of automated disposal decisions.

In one embodiment, when an anomaly is identified based on the computation whether one or more anomalies exist in the time-series of automated disposal decision data for the current period, automatically accessing a time-series of automated disposal decision data for a historical period for the automated disposal decision workflow; the method further comprises: generating a plot of the time-series of automated disposal decision data for the current period; generating a plot of the time-series of automated disposal decision data for the historical period; and overlapping in a single image the plot of the time-series for the current period and the plot of the time-series for the historical period.

In one embodiment, computing whether one or more anomalies exist in the time-series of automated disposal decision data for the current period includes: providing the single image as input to the trained machine learning model; and predicting by the trained machine learning model whether the one or more anomalies exist based on the single image.

In one embodiment, the trained machine learning model comprises convolution neural networks.

In one embodiment, the method for automated anomaly detection in automated disposal decisions of an automated decisioning workflow of a machine learning-based digital fraud and digital abuse mitigation online service, the method comprising: a distributed network of computers implementing a machine learning-based digital threat mitigation online service that: periodically collects a near real-time or a real-time time-series of automated disposal decision data for a current period from an automated decisioning workflow, wherein the automated decisioning workflow computes one of a plurality of distinct disposal decisions for each distinct input comprising subject digital event data and a machine learning-based threat score computed for the subject digital event data; selects an anomaly detection algorithm from a plurality of distinct anomaly detection algorithms based on a type of digital abuse or digital fraud that the automated decisioning workflow is configured to evaluate; evaluates, using the selected anomaly detection algorithm, the time-series of automated decision data for the current period; computes whether one or more anomalies exist in the time-series of automated disposal decision data for the current period based on the evaluation; and generates an anomaly alert based on the computation.

In one embodiment, when an anomaly is identified based on the computation whether one or more anomalies exist in the time-series of automated disposal decision data for the current period, automatically accessing historical anomaly alert data for the automated disposal decision workflow; and if the generated anomaly alert does not match a historical anomaly alert of the historical anomaly alert data, then communicating the generated anomaly alert in a notification to a subscriber to the machine learning-based online fraud and online abuse mitigation online service.

BRIEF DESCRIPTION OF THE FIGURES

FIG. 2 illustrates an example method in accordance with one or more embodiments of the present application;

DESCRIPTION OF THE PREFERRED EMBODIMENTS

Figure 1:
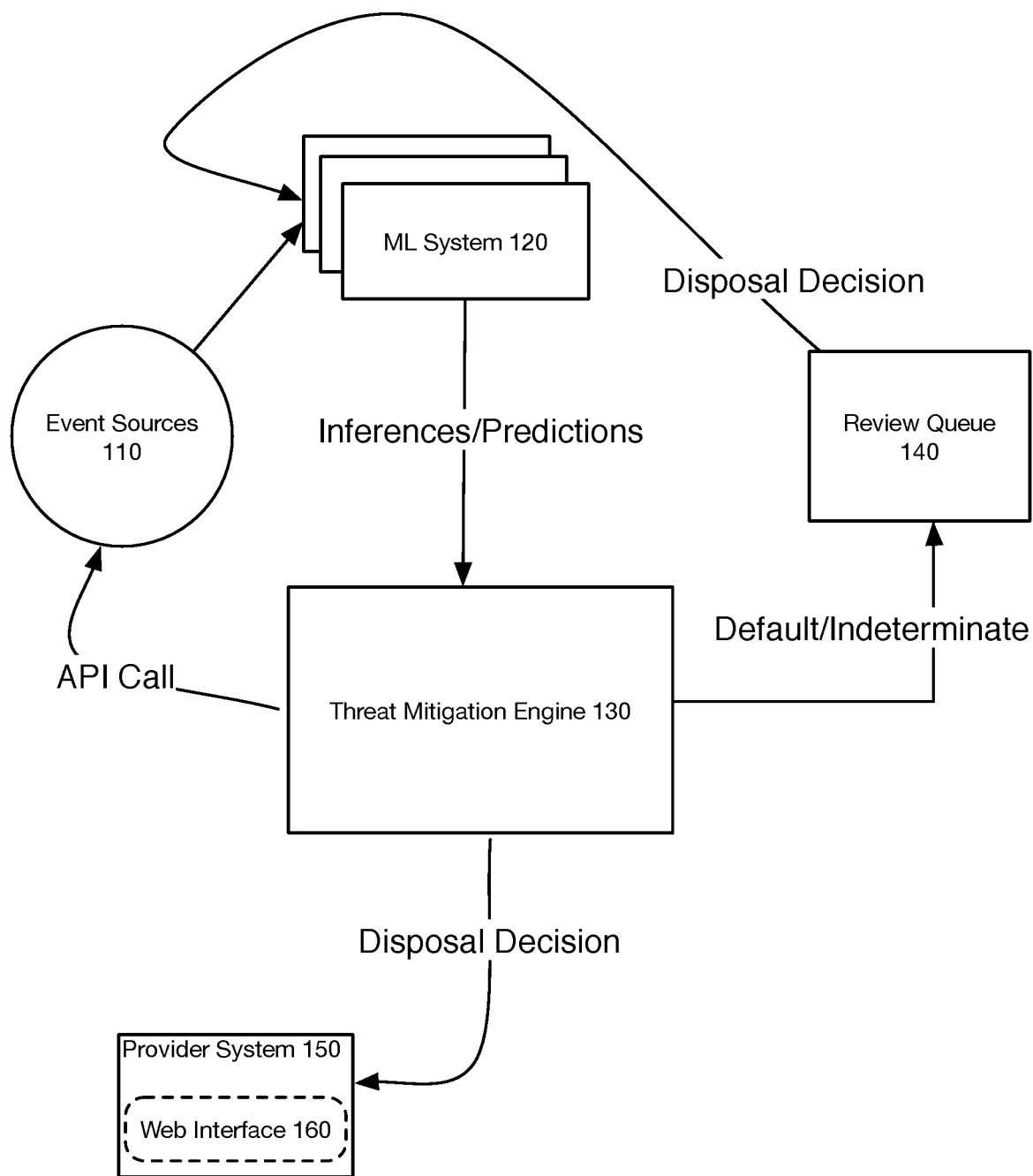
FIG. 1 illustrates a schematic representation of a system in accordance with one or more embodiments of the present application.
Figure 3:
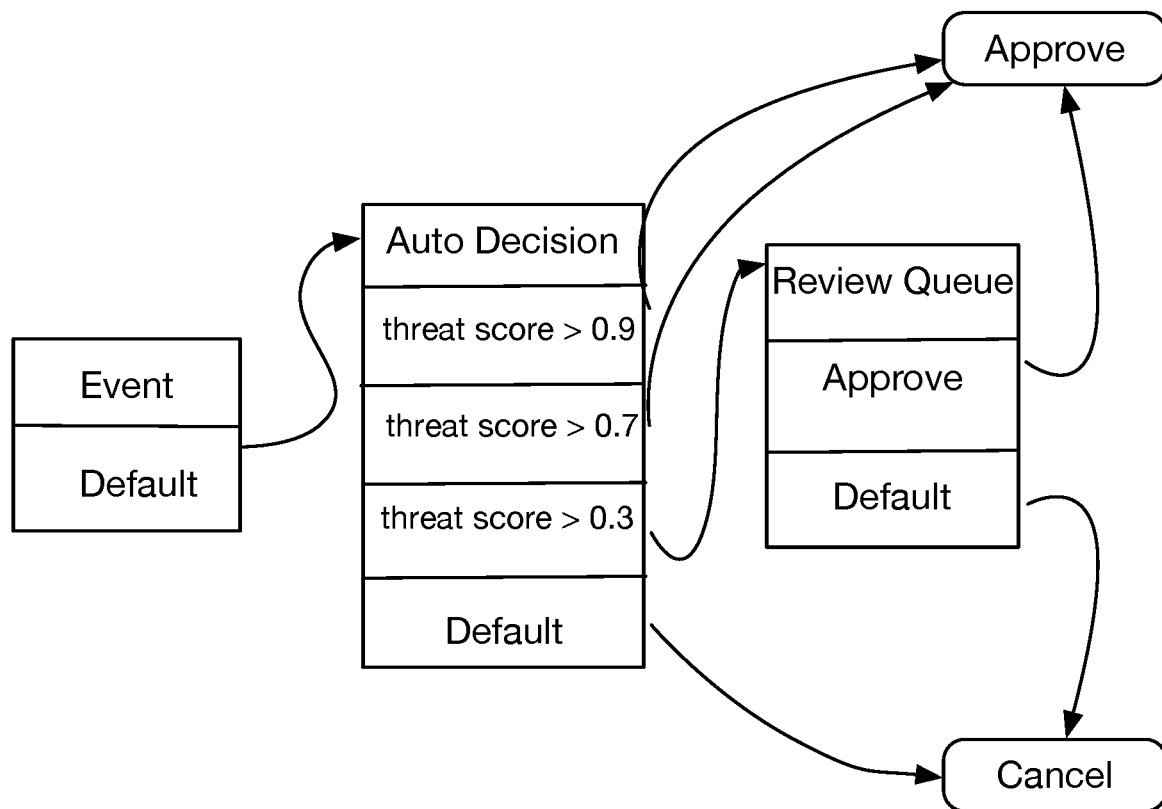
FIG. 3 illustrates a schematic example of an automated workflow in accordance with one or more embodiments of the present application.
Figure 4:
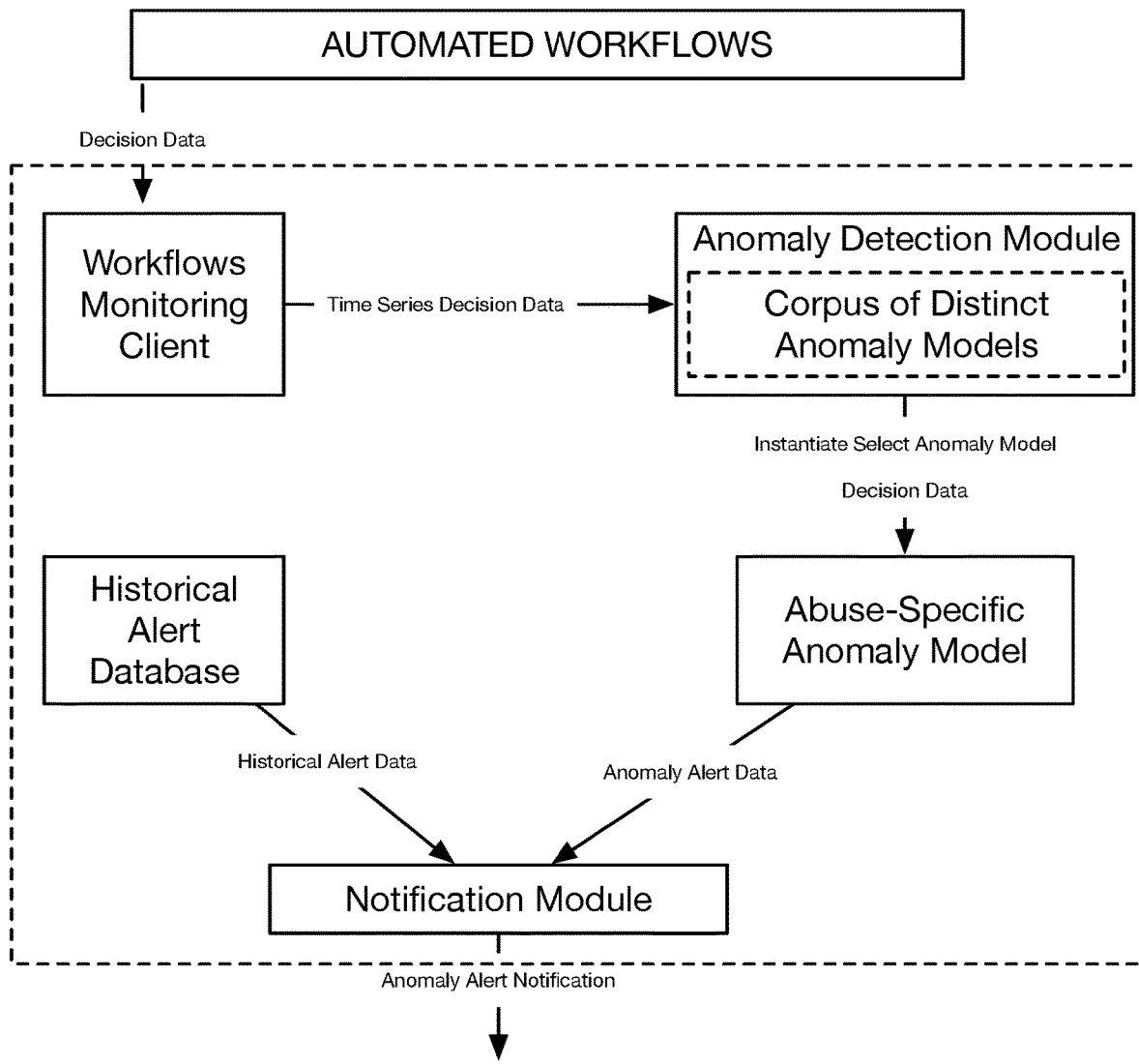
FIG. 4 illustrates a schematic example of a threat service integrated with an anomaly detection module in accordance with one or more embodiments of the present application.

The following description of the preferred embodiments of the invention is not intended to limit the invention to these preferred embodiments, but rather to enable any person skilled in the art to make and use this invention.

As discussed above, digital threats are abounding and continue to evolve to circumvent existing digital fraud detection technologies. The evolving nature of digital threats compounded with the great number of transactions, events, and/or activities (exceeding billions in number) occurring over the web and/or Internet highlight the many deficiencies of traditional digital fraud detection implementations.

The embodiments of the present application, however, provide an advanced technology platform that is capable of ingesting billions of digital events and/or transactions over the Internet, the web, web applications, mobile applications, and the like and dynamically implement digital threat mitigation implementations that are capable of detecting malicious activities, fraudulent activities, digital abuses and generate digital threat mitigation recommendations and responses that operate to mitigate and/or eliminate the digital threats stemming from the malicious or fraudulent activities.

The advanced technology platform of several embodiments of the present application employs a robust ensemble of machine learning models, application programming interfaces (APIs), and related systems that operate to ingest the great number of digital activities performed and events occurring over the web and parse from these great number of digital activities and events a subset of these activities and events that present the greatest likelihood of involving digital fraud and/or digital abuse. Accordingly, using these finely tuned and perpetually tunable machine learning models, a system implementing the several embodiments of the present application can predict and/or estimate with high accuracy and, in some embodiments, in real-time (e.g., as the event is occurring or shortly thereafter) a digital threat score for each event or activity that is sifted by the system. The digital threat score may be exposed via a score API that may function to interact with various endpoints of the digital threat mitigation platform. Specifically, the score API may function to interact with one or more web computing servers that implement the ensembles of machine learning models used to predict a likelihood of digital fraud and/or digital abuse. The score API may function to return a value (e.g., a number, likelihood or probability, or other criterion) that indicates how likely it is that an actor involved or associated with digital events and/or activities is a malicious actor or may be perpetrating cyber fraud or digital abuse (e.g., payment abuse, etc.). Accordingly, the digital threat score calculated by the score API may be used in several manners including to inform digital event data processing decisions (e.g., deny, hold, or approve digital transaction) or to define which of one or more digital threat mitigation automated workflows or implementations that should be applied to future digital event data and/or current the digital events to mitigate or eliminate a digital threat associated therewith.

Workflows Overview

Additionally, the embodiments of the present application further enable the configuration of new digital threat mitigation automated workflows or implementations automatically upon a detection of a new (or evolved) digital threat or semi-automatically with digital threat input from an entity. That is, in some instances, the digital events and activities occurring via the Internet or web (including web and mobile applications) give rise to an unclassified or not fully classified potential digital threat that may require additional or new digital threat mitigation measures that may effectively mitigate the fraud risks associated the digital events. In such instances, the embodiments of the present application employ a digital threat mitigation engine that is capable of building new digital threat mitigation automated workflows or implementations that function to mitigate or eliminate digital threats posed by the unclassified or not fully classified potential digital threat. It shall be noted that, in some embodiments, the digital event posing the potential digital threat may be a classified digital event (e.g., payment abuse), however, due to the digital risks or other risks of loss, enhanced or new digital threat detection automated workflows according to the several embodiments of the present application may need to be implemented in the course of evaluating and processing the digital event.

Using a combination of the digital threat score calculated for a digital actor and/or digital event and a web user interface, the embodiments of the present application enable the definition of new or evolved digital threat mitigation automated workflows executed in association with a digital threat mitigation engine. In particular, via the web user interface, it is possible to identify or define digital events or digital activities occurring over the web or Internet that may be used to trigger a digital intervention (e.g., implementation the new digital threat mitigation automated workflows) and digital event or digital activity processing. The web user interface may similarly be used to define the specific routines and procedures executed by the digital threat mitigation engine once the threat mitigation automated workflows have been triggered.

The digital threat mitigation engine functions to use, as input, a digital threat score and service provider-defined digital threat mitigation automated workflows to generate one or more digital threat mitigation implementations, such as a digital threat mitigation flow. For instance, the digital threat mitigation engine may function to further configure an events API to collect and/or parse events or activity data from multiple events data sources to identify specific events data that may trigger the new digital threat mitigation implementations. In such instance, one aspect of the one or more digital threat mitigation implementations may include digitizing defined threat mitigation policy for integration and enhancement of threat mitigation capabilities of a pre-existing and broader digital threat mitigation service.

1. System for Identifying and Mitigating Digital Threats

As shown in FIG. 1, a system 100 for mitigating digital threats includes a plurality of event sources 110, a machine learning digital fraud detection system 120, a digital threat mitigation engine 130, a review queue 140, a service provider system 150, and web interface 160.

The system 100 may function to enable real-time automatic fraud or abuse detection and augmentation of automatic fraud-detecting capabilities of a pre-existing system. The system 100 may provide web interface 160 that enable subscribers to identify digital circumstances or digital events that may have a high risk of digital fraud and source online activities or digital events to the threat service implementing the system 100. Additionally, the system 100 may be provided with digital fraud mitigation policies that may be used to generate applications and digital process flow (e.g., automated workflows) that can be used to detect the potentially fraudulent events or circumstances and automatically route or dispose the events or circumstances. Accordingly, the system 100 may function to build a digital fraud detection and processing mechanism (workflow) that may be used to augment an existing and broader digital fraud detection system thereby improving an overall technical capability of the broader system to identify digital fraud and deploy fraud mitigation protocols.

The plurality of event sources no may function as sources of digital events and digital activities, occurring fully or in part over the Internet or the web. The plurality of events sources may include a plurality of web servers associated with a plurality of entities seeking to mitigate fraudulent activities involving digital resources of said entities or the like. Accordingly, the plurality of event sources 110 may also include the service provider system 150.

The plurality of event sources 110 may function to capture and/or record any digital activities and/or digital events occurring over the Internet or web involving the web servers of the entities and/or other digital resources (e.g., web pages, web transaction platforms, Internet-accessible data sources, etc.) of the entities. The digital events and digital activities collected by the plurality of event sources 110 may function as input data sources of the machine learning digital fraud detection system 120. Additionally, or alternatively, the plurality of event sources no may function to interface with an events API of the threat service implementing the system 100 and provide events data directly to the events API.

The machine learning digital fraud detection system 120 may include a score API that may function to identify, predict, or classify the distinct digital events data and digital activity data received from the plurality of event sources no. In a preferred embodiment, the system 120 implementing the score API generates a threat score for each distinct set of events and/or activities received via the events API. The machine learning digital fraud detection system 120 may be implemented by a plurality of computing servers (e.g., a combination of web servers and private servers) that implement an ensemble of machine learning models. The ensemble of machine learning models may include hundreds and/or thousands of machine learning models that work together to classify features of digital events data and namely, to classify or detect features that may indicate a possibility of fraud or not. The machine learning fraud detection system 120 may additionally utilize the input from the plurality of event sources 110 and various other data sources (e.g., outputs of system 100, system 100 derived knowledge data, external entity-maintained data, etc.) to continuously improve or accurately tune weightings associated with factors of the ensemble of the machine learning models.

The ensemble of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminant analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), long short-term memory networks (LSTM), bi-directional LSTM, recurrent neural networks (RNN), convolution neural networks (CNN)+attention mechanism, and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. The digital threat mitigation engine 130 functions to construct digital threat mitigation flows and implement the constructed digital threat mitigation flows to enable the digital processing of digital events and/or activities having a high susceptibility or probability of fraud, cyber fraud, or other digitally harmful activities. The digital processing functionality of the digital threat mitigation flow may include the detection of digital fraud within the digital events and deployment of digital fraud mitigation protocols. Additionally, or alternatively, the digital processing functionality may include timely and/or real-time processing of the digital events to automated decision or disposal. Using the web interface 160, a client system may be used to construct flow parameters that the digital threat mitigation engine 130 uses to construct digital threat mitigation flows.

The flow parameters provided via the web interface 160 may include a combination of a digital triggering event, a digital actor (e.g., an online user), digital fraud type and associated threat score thresholds for multiple tiers or stages of digital event evaluation, and disposal decisions and/or actions that indicate a disposition of the digital event. The digital triggering event may be any digital action or digital activity initiated by one or more actors that may be used to initiate a digital threat mitigation flow (e.g., an Internet or web occurrence involving a digital resource of or a digital service provided by an entity).

In one embodiment of the present application, the digital threat mitigation engine 130 may then function to ingest the flow parameters and construct the digital threat mitigation flows. Constructing the digital threat mitigation flows by the digital threat mitigation engine 130 may include setting digital triggering event as an initiator of the flow, configuring multi-tiered or multi-staged computing nodes that may be used to determine an automated disposition of the digital triggering event, and configuring computing nodes that process the automated disposition.

Accordingly, in use, the initiation of the digital threat mitigation flow may preferably be triggered by an occurrence (or receipt from a client system) of the defined digital triggering event. The digital threat mitigation flow, using the client-system defined flow parameters, may function to process and/or evaluate the digital triggering event together with an associated digital actor (if provided) until an automated disposal decision or recommendation is generated by the digital threat mitigation engine 130. Generally, the automated disposal decision or recommendation may be transmitted to the service provider system 150 and may also be converted to machine learning input into the machine learning digital threat mitigation system 120. Accordingly, outputs of the digital threat mitigation engine 130 and review queue engine 140 (as described in more detail below)

may be routed to the machine learning system 120 for improving of the digital fraud and/or digital abuse detection capabilities thereof.

In one aspect of the digital threat mitigation engine 130, a reviewing queue engine 140 may be implemented in combination with the digital threat mitigation engine 130. The reviewing queue engine 140 may preferably be implemented in the circumstances in which an automated disposition for a digital triggering event may be undiscernible (e.g., a triggering digital event does not match or satisfy evaluation flow parameters of the automated decisioning node or the like) by the automated decisioning node (or similar decisioning node of the digital threat mitigation engine 130 or discernible with very low confidence (e.g., confidence being below a minimum confidence threshold) by the digital threat mitigation engine 130 using a digital threat mitigation flow. In such cases, the digital threat mitigation engine 130 may cease processing the triggering digital event according to the digital threat mitigation flow and as a default, flag the digital event as requiring additional scrutiny or review and transmit the triggering digital event to the reviewing queue engine 140.

In some embodiments, the reviewing queue engine 140 may function to discern the triggering digital events deemed undiscernible by preceding nodes of the digital threat mitigation engine 130. Additionally, or alternatively, the reviewing queue engine 140 may function to discern and provide a disposal decision for any digital event data or triggering digital event that was processed through a default node of a preceding node; meaning that the preceding node may not have been able to provide a disposal decision for the digital event data. The reviewing queue engine 140 may be implemented semi-automatically using a combination of manual and automated reviewing protocols implemented by a computing node (e.g., a computing server, computing processor, etc.) that may function to apply predetermined review rules, heuristics, or judgements for undiscernible digital events. The manual review component of the reviewing queue engine 140 may include one or more human analyst or digital fraud experts that may assist in discerning the digital event by providing review input regarding a perceived fraudulent or abusive nature of the digital event or activity.

The disposal decision generated at the reviewing engine queue 140 together with the review input may, in turn, be converted by the system 100 to useable machine learning input into the machine learning digital fraud detection system 120. Thus, the reviewing queue input and disposal decision may be consumed by the machine learning digital fraud detection system 120 as machine learning training data that may be used to adjust weightings of one or more factors of or add new factors (features) with weightings to the existing machine learning models implemented by the machine learning digital fraud detection system 120 thereby improving the technical capabilities of the machine learning digital fraud detection system 120 to evaluate and determine a digital threat level (e.g., digital threat score) associated with digital event data. Additionally, or alternatively, the reviewing input and disposal decision may be consumed by the machine learning digital fraud detection system 120 or generally, by the system 100 to generate one or more new machine learning models incorporating the weightings and/or factors from the reviewing input. The system 100 may function to augment the existing machine learning models implemented by the machine learning digital fraud detection system 120 with the one or more new machine learning models. Converting the disposal decisioning and reviewing input in this way to form machine learning input effectively evolves the fraud detection and technical operability of the underlying computers implementing the machine learning models. In particular, the system 100 implementing the machine learning models would function to identify fraudulent digital activity with faster and with greater accuracy (e.g., better/improved classifications or predictions of fraud).

The service provider 150 may function to provide digital events data to the one or more digital event processing components of the system 100. Preferably, the service provider 150 provides digital events data to an events application program interface associated with the digital threat mitigation engine 130. The service provider 150 may be any entity or organization having a digital online presence that enable customers or users of the digital resources associated with the entity's online presence to perform transactions, exchanges of data, perform one or more digital activities, and the like. The service provider preferably includes a subscriber to a threat service implementing the system 100 and method 200 described herein.

The web interface 160 may function to enable a client system or client device to operably interact with a remote digital threat mitigation platform of the present application. The web interface 160 may include any suitable graphical frontend that can be accessed via a web browser using a computing device. The web interface 160 may function to provide an interface to provide inputs for constructing a digital threat mitigation application flow. For instance, the web interface 160 may provide multiple intuitive input boxes and instruction for defining a decision tree of logic that may be used in generating the predefined ordered process flow of the digital threat mitigation application flow used for processing digital events data.

Additionally, or alternatively, the web interface 160 may function to enable an administrator of an entity to view and/or manage entity data provided to the system 100 and also status information of any pending digital threat mitigation application flow.

The web interface 160 may be used by an entity to make any suitable request including requests to build new digital threat mitigation process application flows, requests to perform synchronous processing of digital event data, requests for status information of a digital threat mitigation application flow in progress, and the like.

4. Method for Anomaly Detection in Automated Workflow Decisions

As shown in FIG. 2, a method 200 for automated anomaly detection in automated workflow-based event decisions includes implementing a monitoring and/or evaluation of subscriber decision data S210, accessing historical decision and/or alert data S220, implementing an anomaly detection model S230, and compute automated alert and remediation S240. The method 200 may optionally or additionally includes configuring one or more subscriber-specific anomaly detection algorithms S205.

2.05 Configuring an Anomaly Detection Model

Optionally, or additionally, S205, which includes configuring an anomaly detection model, may function to configure and/or train an anomaly detection model to identify or detect anomalies in decision data collected from one or more distinct sources of event decision data. In some embodiments, due to a high volume of events and corresponding decisions determined for the events, it may be difficult to manually assess anomalous shifts and/or anomalies in the distributions derived from event decision data. Accordingly, a trained anomaly detection model may function to periodically collect and/or evaluate event decision data from the one or more distinct sources of event decision data. In one or more embodiment, event decision data preferably relates to a computed (or sometimes manually determined) outcome and/or a determination for subject event and/or user data that typically causes a definitive disposal to one or more predetermined routes, which may be informed by the outcome or the determination for the subject event or subject user.

In a preferred embodiment, S205 may function to configure and/or train a distinct anomaly detection model or a distinct ensemble of anomaly detection models for each of a plurality of distinct subscribers to a digital threat mitigation service implementing the method 200 using the system 100 or the like. In other words, in one or more embodiments, S205 may function to configure one or more anomaly detection models per subscriber to the threat mitigation service. In such embodiments, S205 may function to configure or build a corpus of training data samples that includes subscriber-specific data. That is, in such embodiments, the corpus of training data for training a subscriber-specific anomaly detection model may include training data samples sourced directly from the subscriber and/or indirectly from subscriber traffic (i.e., events and/or activities of users of the subscriber) that flow through the threat mitigation service. According to one or more embodiments, in use, the subscriber-specific anomaly detection model may only be used for evaluating decision data for an associated subscriber.

In a variant, S205 may function to configure and/or train a global anomaly detection model that may function to evaluate and/or predict anomalies in event decision data for all or any subscriber to the threat mitigation service.

In some embodiments, a given subscriber to the digital threat mitigation service implementing the method 200 may implement multiple distinct automated workflows for distinct types of digital abuse and/or digital fraud. In a preferred embodiment, S205 may function to train and/or configure a distinct anomaly detection model for each of a plurality of distinct digital abuse and/or digital fraud type. For example, in the case of a first fraud type, a second fraud type, and a third fraud type, S205 may function to train a first anomaly detection model, a second anomaly detection model, and a third anomaly detection model that corresponds to each of the first, second, and third fraud types, respectively. In such preferred embodiment, S205 may function to train each distinct anomaly detection model for handling a specific fraud type with a corpus or one or more corpora of training data samples that relate only to the specific fraud type.

In a variant implementation, S205 may function to configure and/or train a global or a single anomaly detection model that may function to detect an anomalous shift or an anomalous feature for any of the multiple distinct automated workflows for a given subscriber. That is, the global and/or single anomaly detection model may be agnostic with respect to the type of fraud associated with a collection or distribution of event data under evaluation. Accordingly, a corpus of training data samples for training the global or single anomaly detection model may include historical event decision data from some or all of the multiple distinct anomaly detection models.

While, in one or more preferred embodiments, a trained anomaly detection model may be configured to evaluation event decision data sourced from automated decision workflows, it shall be noted that the trained anomaly detection model may function to evaluate decision data from any source including event decision data sourced from API services (e.g., bulk decisions from a subscriber), decisions from a review queue (e.g., manual decisions), and/or the like.

2.10 Monitoring|Collecting Subscriber Decision Data

S210, which includes aggregating event decision data from one or more sources, may function to periodically or continuously gather event data decision data or outcomes from one or more automated event decisioning workflows, which may be referred to herein as "automated workflows". In one or more embodiments, S210 may function to aggregate event decision data to identify anomalies in event decisions or outcomes from the one or more automated event decisioning workflows. In such embodiments, event decision data may include the outcome of an evaluation of digital event data processing model used to inform decisions (e.g., deny, hold or approve digital transaction) for a disposal of digital events, digital users, and/or digital activities under evaluation.

In one or more embodiments, S210 may function to aggregate or collect event decision data indirectly from each of one or more distinct automated workflows. In such embodiments, S210 may function to install a monitoring client or conduit at each of one or more automated workflows whereby the monitoring client collects or aggregates event decisions or outcomes by each of the one or more automated workflows. In such embodiments, the monitoring client or conduit may be in operable communication with a decision database that stores outputs of the one or more automated workflows. Accordingly, the monitoring client may function to collect or aggregate event decisions by copying contents of the decisions database. Additionally, or alternatively, the monitoring client may function to store the collected event decisions into a database or a repository (e.g., a Kafka queue).

Additionally, or alternatively, in one or more embodiments, S210 may function to aggregate or collect event decision data directly from each of one or more distinct automated workflows. In such embodiments, S210 may function to collect or aggregate event decision data as the decision data streams from each of the one or more distinct automated workflows.

Additionally, or alternatively, S210 may function to aggregate or collect event decision data from a subscriber-specified database of event decision data (e.g., a review queue) or through one or more API services into which a subscriber may directly provide decisions. In such embodiments, S210 may function to collect or aggregate event decision data automatically as a decisioning action is specified by the subscriber.

Additionally, or alternatively, S210 may function to aggregate or collect event decision data sourced from one or more manual event or user review sources (e.g., a review queue 140 or the like).

It shall be recognized that S210 may function to source decision data from any suitable and/or accessible source of decision data.

2.20 Accessing Historical Alert and/or Decision Data

S220, which includes accessing historical anomaly data, may function to access historical anomaly and/or anomaly alert data. In one or more embodiments, S220 may function to access historical anomaly data concurrent with an execution of an anomaly detection on one or more automated workflows decision data. In this way, S220 may operate together with S240 to evaluate an instant or currently detected anomaly against the historical anomaly data to determine whether a new anomaly detection alert should be triggered and/or created for the instant or currently detected anomaly. For example, if a newly detected anomaly matches a historical anomaly, S220 operating together with S240 may function to determine that the newly detected anomaly may be known to the system implementing the method 200 or has been previously reported to a given subscriber to which the anomaly alert may be relevant.

In one or more embodiments, each historical anomaly alert and/or corpus of event decision data in which an anomaly was detect may be augmented with timestamp data and potentially with data relating to one or more remediation actions taken to address or otherwise resolve the detected anomaly. Additionally, or alternatively, anomaly alerts of a same type may be enumerated sequentially (e.g., anomaly_1, anomaly_2, anomaly_3, etc.).

Additionally, or alternatively, S220 may function to amend or otherwise modify contemporaneous anomaly alert data. That is, in some embodiments, if a current anomaly alert matches a recent anomaly alert data, S205 may function to amend the new or current anomaly alert data with information identifying the recent anomaly alert as a duplicate of a prior or historical anomaly alert for a given automated workflow or the like.

Additionally, or alternatively, in one or more embodiments, S220 may function to access historical anomaly data from a database of subscriber-specific anomalies. In such embodiments, anomaly alert data may include time series event decision data from one or more automated workflows in which an anomaly was found or that triggered an anomaly alert.

2.30 Implementing Anomaly Detection Model

S230, which includes implementing anomaly detection, may function to deploy in an online setting an anomaly detection model that identifies anomalous event decisions from one or more automated workflows. In one or more embodiments, S230 may function to detect anomalies in subscriber event decision data which may include one or more digital fraud or abuse types to potentially enable identification and/or remediation of anomalous decision outcomes or events.

In a first implementation, the anomaly detection model may be a global model or algorithm that may function to predict or identify anomalies within data for any digital fraud or abuse type of event decisions. In one or more embodiments of a global implementation, the anomaly detection model may be agnostic to the type of digital fraud or abuse in the subscriber event decision data. That is, S230 may be configured broadly by a corpus of event decision data that may not be specific to a particular digital abuse type, and thus may function to detect anomalies in event decision data for any of a plurality of digital fraud or abuse types.

In a second implementation, the anomaly detection model may be an ensemble of distinct anomaly detection algorithms that may each be configured to predict or identify anomalies for one or more specific digital abuse types. In this second implementation, the ensemble of distinct anomaly detection algorithms may include a collection of anomaly detection algorithms designed to operate together to produce a single anomaly prediction. In one or more embodiments of an ensemble implementation, the selection or automatic initialization of one or more of the plurality of distinct anomaly detection algorithms may be based on characteristics or features of the event decision data. In some embodiments, S230 may function to initialize or implement only a single anomaly detection algorithm or a subset of the anomaly detection algorithms that may be most relevant for a fraud or abuse type of the event decision data. Additionally, or alternatively, the selection of one or more of the plurality of distinct anomaly detection algorithms may be based on the type of automated workflow or subscriber-specific criteria (e.g., subscriber might direct model to detect anomalies in payment abuse type). For example, metadata or the like identifying a time-series of event decision data as being sourced from an automated workflow for identifying or decisioning on payment fraud or abuse may automatically cause a selection of an abuse-specific anomaly detection model for identifying anomalies in event decisions data for payment abuse.

In one variant of the second implementation, S230 may function to run each of a plurality of distinct anomaly detection models (algorithms) against the event decision dataset for the one or more automated workflows. In such an embodiment, the plurality of anomaly detection algorithms may execute concurrently or consecutively. S240 may function to expose or return the output of the distinct anomaly detection algorithms that may function to identify an anomaly or an anomalous shift in a distribution of event decision data.

Additionally, or alternatively, in one variant implementation, S230 may function to implement anomaly detection through statistical analysis of event decision data resulting from one or more automated workflows. In one or more embodiments, S230 may function to automatically compare statistical measures of a contemporaneous anomaly dataset (e.g., real-time or near real-time time-series decision data) to those of a historical anomaly dataset (e.g., historical time-series decision data). For example, in one embodiment, S230 may function to compute a distribution for a current time series of event data and compute a distribution for or access a distribution of historical time series of event data. In such example, S230 may function to compare the distribution for the current time series to the distribution of the historical time series and compute one or more statistical measures (e.g., statistical differences) to determine whether there is an anomalous difference between the two distributions.

Additionally, or alternatively, in a further variant implementation, S230 may function to implement a trained machine learning model, preferably a trained sequencing model (e.g., LSTM, RNN), that may function to predict a time-series of predicted automated disposal decision data for the current period matching the period from which the contemporaneous anomaly dataset is pulled from. In such embodiments, an anomaly detection statistical algorithm may be applied against the predicted distribution of the sequencing model and a distribution of the contemporaneous decision data to determine whether one or more anomalies exist in the time-series of decision data for the current period.

Additionally, or alternatively, in yet a further variant implementation, S230 may function to implement an anomaly detection algorithm that may include one or more deep neural networks, such as a convolutional neural network or other neural network having multilayer perceptrons or the like. In such implementation, S230 may function to generate a first image of a historical distribution of automated workflow decisioning data for a historical period and a second image of a current or real-time distribution of automated workflow decisioning data for a current period. S230 may function to provide the first and the second image as input to the convolutional neural network or the like, which may function to predict whether an anomaly exists in the comparison of the first and the second image.

It shall be known that in generating the first and/or the second image, S230 may function to automatically generate a plot of the time-series of automated disposal decision data for the historical period, current/contemporaneous period, and/or predicted period. In some embodiments, such as embodiments involving the convolutional neural network, S230 may function to overlap/superimpose a first image and a second image of decisioning data in a single image and/or create a comparison between a plot for the historical or predicted decisioning data and the plot for the current/contemporaneous decisioning data.

In each of the implementations and/or variant implementations described herein, S230 may function to apply one or more anomaly thresholds against the predictions or the outputs of the anomaly detection models to confirm whether an anomaly exists in the current or real-time time series of automated workflow decisioning data. In a preferred embodiment, the anomaly threshold may relate to a minimum statistical difference in the distributions of the current and historical or predicted data, minimum statistical variation, minimum different between the current and predicted, and/or the like.

Additionally, or alternatively, in one variant implementation, S230 may function to identify and/or indicate one or more root causes of a detected anomaly (e.g., a promotion or change in subscriber's integration scheme). In such embodiments, S230 may function to additionally compute or otherwise, record attributes of the detected anomaly and based on the attributes of the detected anomaly, S230 may additionally function to identify one or more probably root causes. Accordingly, as described in more detail in S240, an anomaly alert notification to a system or a subscriber may additionally or alternatively be augmented with root cause data.

2.40 Anomaly Alert|Anomaly Remediation

S240, which includes generating an anomaly alert notification, may function to compute an anomaly alert notification based on an evaluation of one or more outputs of the anomaly detection model. In one or more embodiments, S240 may function to compute an anomaly alert notification that notifies an affected system or party of the detection of one or more anomalies in event decision outcomes or data of one or more automated workflows. Preferably, the anomaly alert notification comprises an identification of the one or more subject datasets of anomalous event decision outcome(s) that may have caused the anomaly alerts and anomaly alert notification for further evaluation and/or remediation. Additionally, or alternatively, in one or more embodiments, S240 may function to automatically implement any of a plurality of remediation protocols or actions for resolving a given anomaly alert notification.

2.41 Notification Generation

In one or more embodiments, S240 may function to identify or detect an anomaly alert and generate an anomaly alert notification if circumstances relating to the detection of the anomaly alert satisfy one or more predetermined alert notification requirements and/or thresholds.

In a first implementation, S240 may function to compute an anomaly alert notification when anomaly predictions are produced by a subject anomaly model in a predetermined number of successive distinct anomaly evaluations. In such embodiments, S240 may function to evaluate the number of anomaly alerts computed against an alert notification threshold, which may include a minimum number (e.g., minimum of 3 or the like) of successive anomaly alerts required before an anomaly alert notification may be generated. For example, if in three (3) distinct but successive anomaly evaluation periods, a subject model detects an anomaly in each evaluation period, S240 may function to assess the number of successive alerts against an anomaly alert notification threshold of 3 that, when satisfied, causes the automatic generation of an anomaly alert notification.

Additionally, or alternatively, in a variant of the first implementation, S240 may function to compute an anomaly alert if a predetermined number of anomaly predictions are produced by a subject anomaly model within a predetermined period. In this second implementation, S240 may not require that the evaluation period be successive or in series. For example, S240 may function to generate an anomaly alert notification if three (3) or more anomaly alerts are generated by a given anomaly alert model within one hundred twenty (120) minutes or the like.

Additionally, or alternatively, in a second implementation, S240 may function to compare metadata (e.g., abuse type or time of anomalous decision event) or features of the computed anomaly alert to a historical alert dataset. The historical alert dataset may include one or more detected anomalies or previously generated alerts for a given subscriber or for a given automated workflow. In this way, S240 may function to validate an anomaly model-produced anomaly alert and/or independently assess event decision data for anomalous activities or instances prior to or contemporaneous with a generation of an anomaly alert notification. Additionally, or alternatively, in such embodiments, S240 may function to automatically amend or otherwise modify an anomaly alert to include metadata that may include one or more of a corpus of event decision data in which an anomaly was identified, an anomaly alert type (e.g., payment abuse, content abuse, user threat, etc.), an indication of a probable course of action for resolving the anomaly alert, an indication to escalate or hold remediation actions, and/or the like. Additionally, or alternatively, S240 may function to automatically implement one or more remediation protocols informed by a comparison of contemporaneous or current anomaly alert data to historical anomaly alert data.

2.42 Anomaly Remediation

S240 includes a S242, which may function to identify and/or automatically implement one or more remediation protocols to mitigate or correct a root cause of an anomaly predicted or identified in one or more automated workflows. In one or more embodiments, S242 may function to implement a remediation protocol to automate one or more correction or mitigation procedures to improve anomaly prediction or identification. In such embodiments, S242 may function to evaluate a performance of one or more underlying threat scoring models that produce threat score inputs to the one or more automated workflows with anomalous decision data.

Additionally, or alternatively, in one or more embodiments, one or more anomaly detection models may be trained to predict a root cause of a subject anomaly alert. In one or more variant embodiments, an anomaly detection model may be accompanied with a distinct root cause detection model that predicts a root cause for a given anomaly alert. Accordingly, S242 may function to augment a subject anomaly alert with an associated root cause for purposes of identifying an appropriate remediation protocol or action for resolving the subject anomaly alert.

In a first implementation, S242 may function to automatically generate a notification comprising a query or instruction to the subscriber regarding a detected anomaly alert. Preferably, the automated notification may be presented via a web interface that is in operable communication with the automated anomaly detection system. In one or more embodiments, the automated notification may include data about the predicted or identified anomaly and/or features of the event decision data in which an anomaly was detected.

In such embodiments, the query to the subscriber may request verification of current inputs to or threshold settings of the automated workflows (e.g., threshold values for digital fraud and/or abuse). Additionally, or alternatively, the query may request the subscriber to verify characteristics of the data provided to the automated workflow. In such embodiments, S242 may automatically deploy one or more remediation protocols based on the subscriber's response to the automated notification.

In one or more embodiments of the first implementation, S242 may function to automatically query the subscriber to confirm if known business conditions (e.g., promotions) exist that may influence the prevalence or rate of occurrence of one or more abuse types for which anomalous behavior was detected. In such embodiments, S242 may function to automatically build a temporary patch and/or update threshold values of the automated workflows to account for confirmed known business conditions in the anomaly detection schema. Additionally, or alternatively, in such embodiments, S242 may function to silence future alerts for detected anomalies in one or more abuse types for a specified period of time (e.g., the duration of a promotional period).

In a further implementation, S242 may function to trigger a calibration check on the threat score models underlying the automated workflows. In one or more embodiments, S242 may function to automatically detect unexpected shifts or unusually large shifts in the classification proportions of one or more abuse types. In such embodiments, S242 may function to perform classification accuracy testing against a training event decision dataset.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for automated anomaly detection in automated disposal decisions of an automated decisioning workflow of a machine learning-based online fraud and online abuse mitigation platform, the method comprising:
   periodically collecting a near real-time or a real-time time-series of automated disposal decision data for a current period from an automated decisioning workflow, wherein the automated decisioning workflow computes one of a plurality of distinct disposal decisions for each distinct input comprising subject online event data and a machine learning-based threat score computed for the subject online event data;
   selecting an anomaly detection algorithm from a plurality of distinct anomaly detection algorithms based on a type of online abuse or online fraud that the automated decisioning workflow is configured to evaluate;
   evaluating, using the selected anomaly detection algorithm, the time-series of automated decision data for the current period;
   computing whether one or more anomalies exist in the time-series of automated disposal decision data for the current period based on the evaluation; and
   generating an anomaly alert based on the computation.

2. The method according to claim 1, further comprising:
   automatically accessing, from a historical decisions database, a historical time-series of automated disposal decision data collected during a historical period from automated decisioning workflow,
   wherein evaluating the time-series automated disposal decision data for the current period includes evaluating the time-series of automated disposal decision data for the current period against the historical time-series of automated disposal decision data from the historical period.

3. The method according to claim 2, further comprising:
   computing one or more current decision rates for at least one of the plurality of distinct disposal decisions of the automated decision workflow based on the time-series of automated disposal decision data for the current period; and
   computing one or more historical decision rates for the at least one of the plurality of distinct disposal decisions of the automated decision workflow based on the time-series of automated disposal decision data for the historical period.

4. The method according to claim 3, wherein
   the anomaly detection algorithm comprises a statistically-based algorithm that, when applied, computes one or more statistical difference values between the one or more current decision rates and the one or more historical decision rates.

5. The method according to claim 4, wherein
   computing the one or more statistical difference values includes:
      arranging the time-series of automated disposal decision data for the current period in an overlapping manner with the time-series of automated disposal decision data for the historical period; and
      computing one or more statistical difference values along each of a plurality of distinct time slices of the overlapping time-series of automated disposal decision data.

6. The method according to claim 4, wherein
   computing whether one or more anomalies exist in the time-series of automated disposal decision data for the current period includes:
      identifying whether the one or more statistical difference values satisfy an anomaly detection threshold.

7. The method according to claim 1, wherein
   the anomaly detection algorithm includes implementing a trained machine learning algorithm that predicts a time-series of predicted automated disposal decision data for the current period; and
   the anomaly detection algorithm, when applied, includes computing one or more statistical difference values between the one or more current decision rates and one or more predicted decision rates computed based on the time-series of predicted automated disposal decision data.

8. The method according to claim 7, wherein
   computing whether one or more anomalies exist in the time-series of automated disposal decision data for the current period includes:
      identifying whether the one or more statistical difference values satisfy an anomaly detection threshold.

9. The method according to claim 7, wherein
the trained machine learning algorithm comprises long short-term memory networks.

10. The method according to claim 1, wherein:
when an anomaly is identified based on the computation whether one or more anomalies exist in the time-series of automated disposal decision data for the current period, automatically accessing historical anomaly alert data for the automated disposal decision workflow; and
if the generated anomaly alert does not match a historical anomaly alert of the historical anomaly alert data, then communicating the generated anomaly alert in a notification to a subscriber to the machine learning-based online fraud and online abuse mitigation platform.

11. The method according to claim 1, wherein:
when an anomaly is identified based on the computation whether one or more anomalies exist in the time-series of automated disposal decision data for the current period, automatically accessing historical anomaly alert data for the automated disposal decision workflow; and
if the generated anomaly alert matches a historical anomaly alert of the historical anomaly alert data, then muting the generated anomaly alert.

12. The method according to claim 1, wherein
when an anomaly is identified based on the computation whether one or more anomalies exist in the time-series of automated disposal decision data for the current period:
computing a root cause of the anomaly based on characteristics of the anomaly; and
generating a proposed remediation response to the anomaly based on the root cause.

13. The method according to claim 12, wherein:
if the generated anomaly alert does not match a historical anomaly alert of historical anomaly alert data, then communicating the generated anomaly alert in a notification to a subscriber to the machine learning-based online fraud and online abuse mitigation platform;
the notification comprises the root cause of the anomaly and the proposed remediation response.

14. The method according to claim 1, wherein
the anomaly detection algorithm includes implementing a trained machine learning algorithm that predicts an anomaly based on input image comprising current and historical time-series data of automated disposal decisions.

15. The method according to claim 14, wherein:
when an anomaly is identified based on the computation whether one or more anomalies exist in the time-series of automated disposal decision data for the current period, automatically accessing a time-series of automated disposal decision data for a historical period for the automated disposal decision workflow;
the method further comprises:
generating a plot of the time-series of automated disposal decision data for the current period;
generating a plot of the time-series of automated disposal decision data for the historical period; and
overlapping in a single image the plot of the time-series for the current period and the plot of the time-series for the historical period.

16. The method according to claim 15, wherein
computing whether one or more anomalies exist in the time-series of automated disposal decision data for the current period includes:
providing the single image as input to the trained machine learning model; and
predicting by the trained machine learning model whether the one or more anomalies exist based on the single image.

17. The method according to claim 14, wherein
the trained machine learning model comprises convolution neural networks.

18. A method for automated anomaly detection in automated disposal decisions of an automated decisioning workflow of a machine learning-based digital fraud and digital abuse mitigation online service, the method comprising:
a distributed network of computers implementing a machine learning-based digital threat mitigation online service that:
periodically collects a near real-time or a real-time time-series of automated disposal decision data for a current period from an automated decisioning workflow, wherein the automated decisioning workflow computes one of a plurality of distinct disposal decisions for each distinct input comprising subject digital event data and a machine learning-based threat score computed for the subject digital event data;
selects an anomaly detection algorithm from a plurality of distinct anomaly detection algorithms based on a type of digital abuse or digital fraud that the automated decisioning workflow is configured to evaluate;
evaluates, using the selected anomaly detection algorithm, the time-series of automated decision data for the current period;
computes whether one or more anomalies exist in the time-series of automated disposal decision data for the current period based on the evaluation; and
generates an anomaly alert based on the computation.

19. The method according to claim 18, wherein:
when an anomaly is identified based on the computation whether one or more anomalies exist in the time-series of automated disposal decision data for the current period, automatically accessing historical anomaly alert data for the automated disposal decision workflow; and
if the generated anomaly alert does not match a historical anomaly alert of the historical anomaly alert data, then communicating the generated anomaly alert in a notification to a subscriber to the machine learning-based online fraud and online abuse mitigation online service.

* * * * *